(12) United States Patent
Bazinet

(10) Patent No.: US 10,285,390 B1
(45) Date of Patent: May 14, 2019

(54) FISHING LURE WITH ROTATABLE FINS

(71) Applicant: Normand Bazinet, Guelph (CA)

(72) Inventor: Normand Bazinet, Guelph (CA)

( * ) Notice: Subject to any disclaimer, the term of this patent is extended or adjusted under 35 U.S.C. 154(b) by 0 days.

(21) Appl. No.: 15/842,665

(22) Filed: Dec. 14, 2017

(51) Int. Cl.
A01K 85/10 (2006.01)
A01K 85/14 (2006.01)
A01K 97/01 (2006.01)

(52) U.S. Cl.
CPC .............. A01K 85/14 (2013.01); A01K 97/01 (2013.01)

(58) Field of Classification Search
CPC ................................ A01K 85/10; A01K 85/18
USPC ........................................................... 43/42.03
See application file for complete search history.

(56) References Cited

U.S. PATENT DOCUMENTS

| 1,177,281 | A | * | 3/1916 | Schweickert | A01K 85/16 43/42.05 |
| 1,188,583 | A | * | 6/1916 | Townsend | A01K 85/16 43/42.16 |
| 1,499,819 | A | * | 7/1924 | Goble | A01K 85/18 43/42.15 |
| 1,857,312 | A | * | 5/1932 | Kuehn | A01K 85/18 43/42.02 |
| 2,545,398 | A | * | 3/1951 | Warobiew | A01K 85/18 43/42.16 |
| 2,557,516 | A | * | 6/1951 | Schipper | A01K 85/16 43/42.22 |
| 3,196,574 | A | * | 7/1965 | Weimer | A01K 85/16 43/42.03 |
| 3,973,350 | A | * | 8/1976 | England | A01K 85/16 43/42.03 |
| 5,088,226 | A | * | 2/1992 | Bazinet | A01K 85/16 43/42.03 |
| 5,887,378 | A | * | 3/1999 | Rhoten | A01K 85/14 43/42.03 |
| 6,061,949 | A | * | 5/2000 | Fairchild | A01K 85/16 43/42.24 |

* cited by examiner

Primary Examiner — Christopher P Ellis

(57) ABSTRACT

An artificial fishing lure has a stream-lined elongated body generally simulating a fish. The body has a cavity therein to receive a U-shaped member that is oriented to have two substantially parallel fins extending rearward outside of the body. The U-shaped member has a base and tab extending therefrom. The cavity is shaped to limit movement of the U-shaped member in an up and down rotational motion relative to the body. The body is formed from an upper body and a lower body. The U-shaped member is inserted into the cavity and the upper body and lower body are then affixed to one another. A method of constructing the lure is described.

22 Claims, 5 Drawing Sheets

FISHING LURE WITH ROTATABLE FINS

This invention relates to an artificial fishing lure and, in particular, to a fishing lure that is for use in water with a fishing line while ice fishing or still fishing in open water. More particularly, the lure has lateral fins that rotate up and down as the lure moves down and up respectively in the water in a forward direction.

DESCRIPTION OF THE PRIOR ART

Bazinet U.S. Pat. No. 5,088,226 describes an artificial fishing lure with an elongated body generally simulating a fish. Lateral fins extend along either side of the body and are mounted on a fixed pivot axis that extends through the body. Two lugs extend outward from each side of the body to provide an upper and lower limit of movement for the fins.

SUMMARY OF THE INVENTION

An artificial fishing lure for use in water with a fishing line while ice fishing or still fishing, the lure comprising:
  a) a stream-lined elongated body generally simulating a fish, the body having a head and a tail, the body having a cavity located therein approximately one quarter of the distance from a forward end of the body to a rearward end of the body;
  b) the cavity having a first portion and a second portion, the first portion extending through the body and being open at each side, the cavity shaped to receive a U-shaped member, the second portion being closed at each side;
  c) the U-shaped member having a base and two substantially parallel fins extending from opposite ends of said base, with a tab extending from a central portion of the base, the central portion of the base and the tab being located within the cavity and the two parallel fins extending rearward outside of the cavity, along either side of the body toward the tail, the tab being located at least partially within the second portion;
  d) the base, the tab and the cavity being shaped to limit downward and upward movement of the parallel fins relative to the body within a predetermined range;
  e) an attachment on the body to attach a fishing line to the body and at least one fish hook extending outward from the body;
  f) the two parallel fins each having a leading edge and a trailing edge, the two parallel fins importing forward motion to the lure by the trailing edge moving upward relative to the leading edge when the lure is lowered in the water and moving downward relative to the leading edge when the lure is raised in the water.

A method of constructing an artificial fishing lure, the fishing lure comprising an upper body and a lower body, a U-shaped member having a base and two substantially parallel fins extending from opposite ends of the base, with a tab extending from a central portion of the base, the U-shaped member being sized and shaped to be partially mounted in a cavity, the method comprising:
  a) sizing and shaping the upper and lower bodies to fit together to form a single body to generally simulate a fish;
  b) locating a first portion of the cavity and a second portion of the cavity in a lower surface of the upper body and/or an upper surface of the lower body, shaping the first portion of the cavity and the second portion of the cavity to form the cavity that is sized and shaped to receive the central portion of the base and the tab of the U-shaped member and to limit movement of the two parallel fins when the upper and lower bodies are placed together, forming the first portion of the cavity to extend through the body and forming the second portion of the cavity to be closed at each side of the body;
  c) inserting the U-shaped member between the upper body and the lower body and fitting the upper body and the lower body together so that the central portion of the base and the tab is located within the cavity, and at least partially within the second portion, with the two parallel fins being located outside of the cavity and extending rearward along either side of the body, the two parallel fins being movable through a limited range relative to the cavity and relative to the body, affixing the upper and lower body to one another; and
  d) installing an attachment on the upper body for a fishing line and installing at least one fish hook on the body.

DETAILED DESCRIPTION

Figure 1:
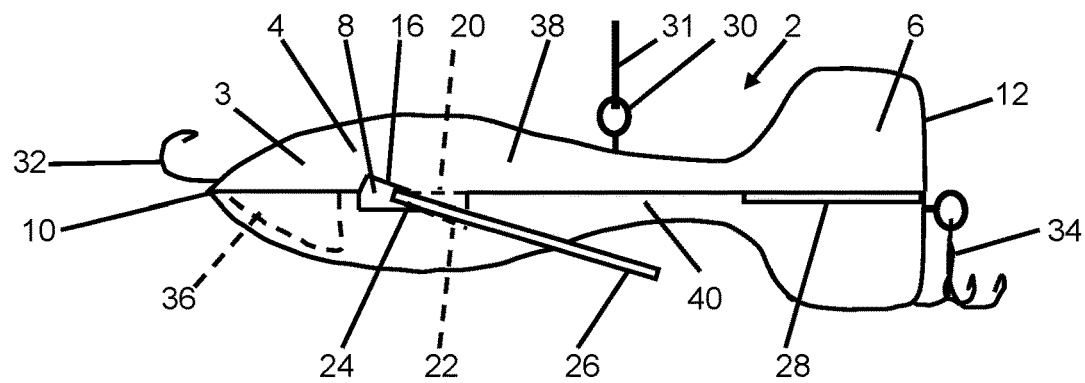
FIG. 1 is a side view of a first embodiment of an artificial fishing lure in accordance with the present invention having an elongated body with two parallel movable fins in a lowermost position.
Figure 2:
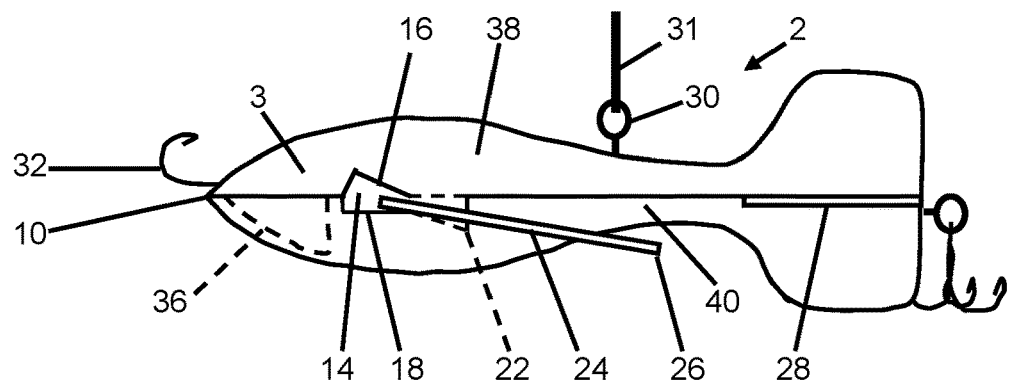
FIG. 2 is a side view of the fishing lure of FIG. 1 with the two parallel fins in an intermediate position.
Figure 3:
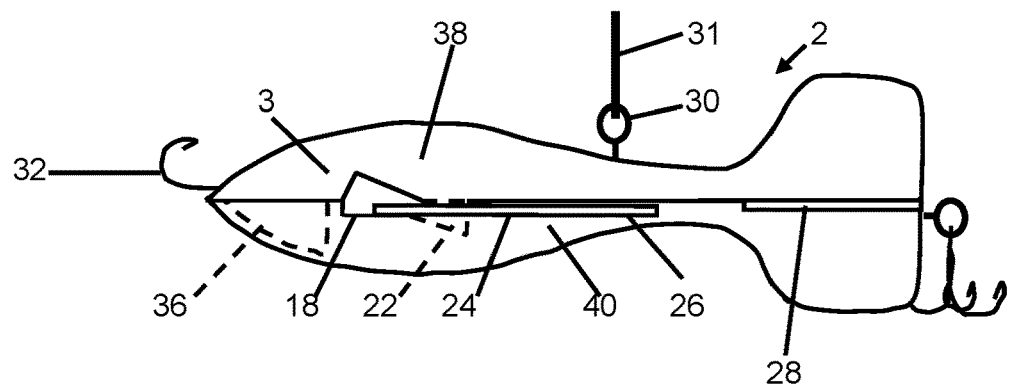
FIG. 3 is a side view of a fishing lure as shown in FIG. 1 with the two parallel fins being in an uppermost position.

In FIGS. 1, 2 and 3, in a first embodiment, a lure 2 has a streamlined elongated body 3 generally simulating a fish, the body having a head 4 and tail 6. A cavity 8 is located in the body 3 approximately one quarter of the distance from a forward end 10 to a rearward end 12. The cavity 8 has a first portion 14 with a ceiling 16 that is angled upward toward the forward end 10 and a floor 18 that is substantially horizontal when the lure 2 is substantially horizontal. The cavity 8 has a second portion 20 with a supporting surface 22 that is angled downward from the first portion toward the rearward end 12. The cavity 8 is shaped to receive a U-shaped member 24 that is mounted within the cavity 8 with two parallel fins 26 (only one of which is shown in FIGS. 1, 2 and 3) along either side of the body 2 that extend rearward from the cavity 8.

There are two guides 28 (only one of which is shown in FIGS. 1, 2, and 3), one guide 28 being located on either side of the body 2 between the U-shaped member 24 and the rearward end 12. An attachment 30 on an upper surface of the body 3 between the cavity 8 and the tail 6 enables a fishing line 31 to be connected to the lure 2. Preferably, the attachment 30 for the fishing line 31 is located to suspend the lure in the air in a substantially horizontal plane. A fish hook 32 extends outward from the body at the forward end 10. Another fish hook comprising a plurality of fish hooks 34 are fixed to a rearward end 12 of the lure 2.

In operation, the parallel fins move downward from a force of the water as the lure moves upward in the water and move upward as the lure moves downward in the water. In FIG. 1, the parallel fins 26 are in a lowermost position. In FIG. 2, the parallel fins 26 are in an intermediate position and in FIG. 3, the parallel fins are in an uppermost position. The weight 36 shown in the drawings is preferably embedded into the lower body 40. The purpose of the weight is to have the head 4 dip down slightly relative to the tail 6 when the lure 2 is lowered in the water when suspended from the fishing line 31. The body 3 shown in FIGS. 1, 2 and 3 has an upper body 38 and a lower body 40.

Figure 4:
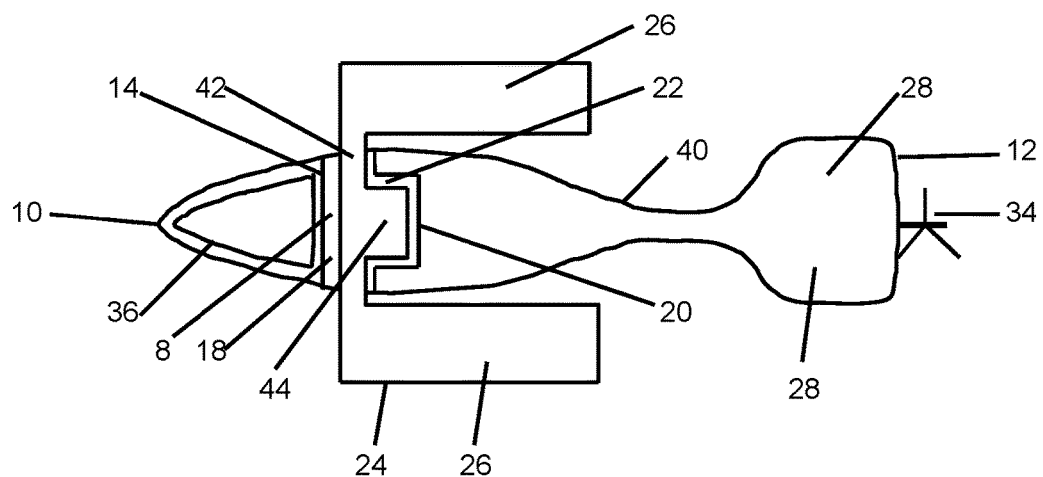
FIG. 4 is a top view of a lower body of the fishing lure of FIG. 1 with a U-shaped member located in a partial cavity.

In FIG. 4, there is shown a top view of the lower body 40, which contains the floor 18 of the first portion 14 of the cavity 8 and the supporting surface 22 of the second portion 20 of the cavity 8. The U-shaped member 24 has a base 42 with a tab 44 extending rearward from a central portion of the base 42. It can be seen that the floor 18 and supporting surface 22 are slightly larger than the base 42 and tab 44. The tab 44 extends at least partially into the second portion 20 and a range of movement of the tab 44 is limited by the second portion 20. As a result, the U-shaped member 24 can move forward, rearward or sideways slightly within the confines of the cavity 8 (only partially shown in FIG. 4) as the lure 2 moves in the water. While the parallel fins 26 pivot relative to a pivot axis of the U-shaped member 24, the pivot axis is not fixed and will vary with movement of the base 42 and tab 44 within the cavity 8. The base 42 extends through the cavity 8 and extends beyond the body 2 to support the parallel fins 26. The same reference numerals are used in FIG. 4 as those used in FIGS. 1, 2 and 3 for those components that are identical.

Figure 5:
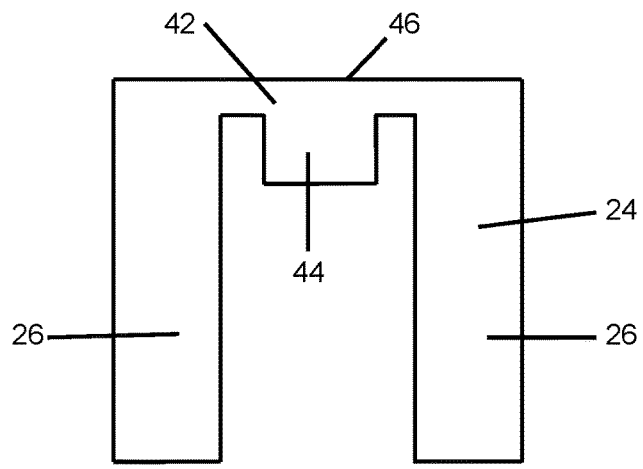
FIG. 5 is a top view of a U-shaped member with a tab extending rearward from a central portion of a base.
Figure 6:
FIG. 6 is a view of a leading edge of the U-shaped member of FIG. 5.

In FIG. 5, there is shown a top view of the U-shaped member 24 and in FIG. 6, there is shown an edge view of the U-shaped member 24 along a leading edge 46. When the U-shaped member 24 pivots, it will tend to pivot about the leading edge 46. In FIG. 6, it can be seen that the U-shaped member is planar. The U-shaped member is preferably planar and rigid, though it could be non-planar and rigid. Further, the U-shaped member could be somewhat flexible and resilient instead of being rigid. For example, the tab could be angled upward or downward relative to the fins and the base of the U-shaped member or the tab and base could be angled upward or downward relative to the fins of the U-shaped member.

Figure 7:
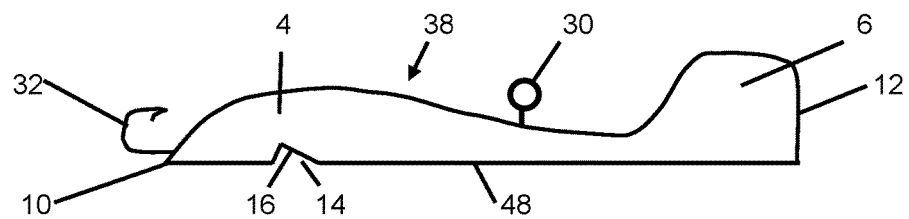
FIG. 7 is a side view of an upper body of the fishing lure of FIG. 1.
Figure 8:
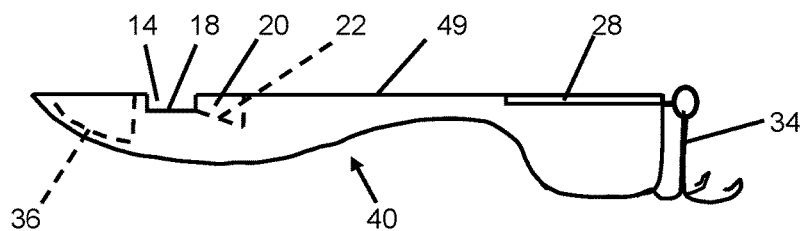
FIG. 8 is a side view of a lower body of the fishing lure of FIG. 1.

In FIG. 7, there is shown a side view of the upper body 38 having a lower surface 48. In FIG. 8, there is shown a side view of the lower body 40 having an upper surface 49. Preferably, the cavity is formed partially in the upper body and partially in the lower body.

Figure 9:
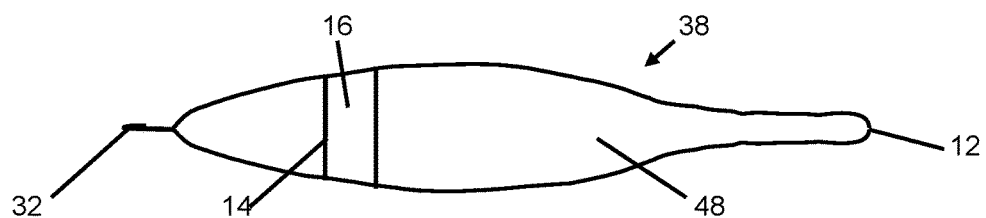
FIG. 9 is a bottom view of the upper body shown in FIG. 7 of the fishing lure.

In FIG. 9, there is shown a bottom view of the upper body 38. The same reference numerals are used in FIGS. 5 to 9 as those used in FIGS. 1 to 4 for those components that are identical.

In FIG. 1, it can be seen that the lowermost position of the parallel fins 26 is limited by the base contacting the ceiling 16 and/or the tab contacting the supporting surface 22. In FIG. 3, it can be seen that the uppermost movement of the parallel fins 26 is limited by the base contacting the floor 18 and/or the tab contacting a lower surface of the upper body 38.

The U-shaped member 24 is preferably made from a material that will not corrode or rust because of contact with water, for example, stainless steel, but other non-corrosive materials will also be suitable. The weight 36 could be located in the upper body rather than the lower body or it could be made part of the upper and/or lower body in an area of the head of the body.

Figure 10:
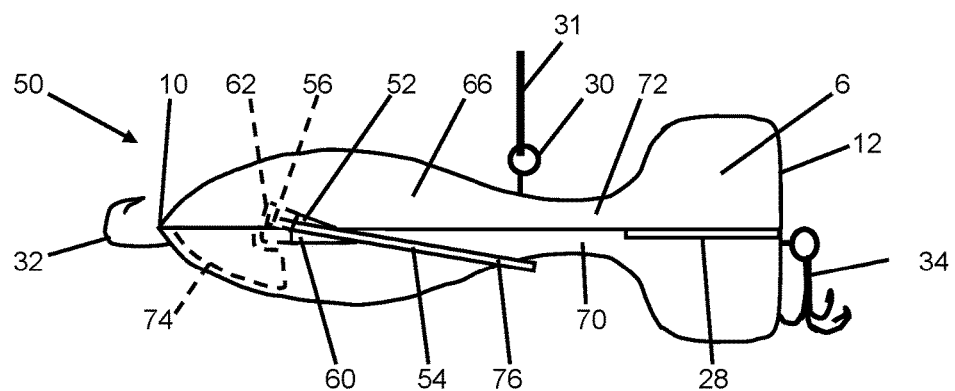
FIG. 10 is a side view of a second embodiment of an artificial fishing lure having an elongated body with a cavity having a U-shaped member supported therein.

The body 2 is divided into the upper body 38 and the lower body 40 to enable the cavity 8 to be formed partially in the upper body 38 as shown in FIGS. 7 and 9 and partially in the lower body as shown in FIGS. 8 and 10. After the cavity is formed, the U-shaped member 24 can be placed into the partial cavity, preferably, the cavity of the lower body 40. The weight 36 is also inserted into an appropriate location, which is preferably the lower body 40, as shown in FIG. 8. The upper body and the lower body are then aligned and affixed to one another, preferably by an adhesive. Many types of adhesives are suitable, for example, Crazy Glue (a trademark) to form the body as shown in FIGS. 1 to 3. After assembly, the U-shaped member is movably mounted within the cavity and the parallel fins are able to move or rotate upward or downward relative to the body.

When the fishing lure is immersed in water and moved up and down by manipulating the fishing line, the movement of the parallel fins causes the lure to move forward to simulate a swimming fish. The lure moves forward in a circular motion as well.

Figure 11:
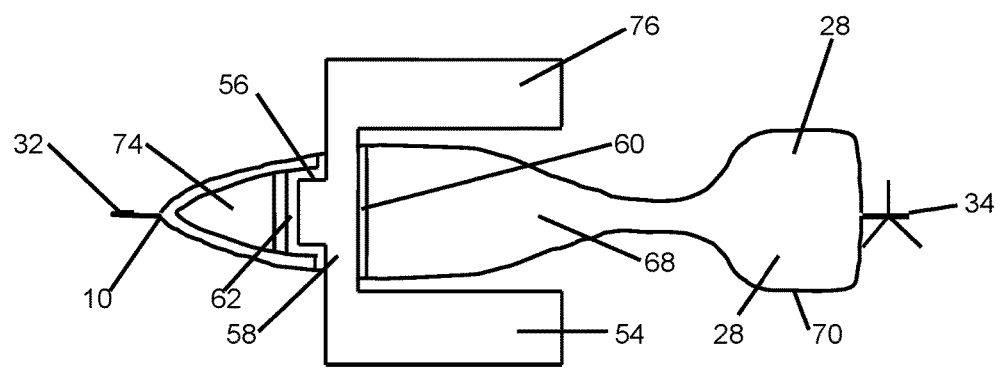
FIG. 11 is a top view of a lower body of the second embodiment with a U-shaped member located in a partial cavity.

In FIGS. 10 and 11, there is shown a second embodiment of an artificial fishing lure 50 having a cavity 52 for supporting a U-shaped member 54. The U-shaped member 54 has a tab 56 extending forward from a central portion of a base 58 of the U-shaped member 54. The cavity 52 has a first portion 60 and a second portion 62 located in a lower surface of an upper body 66 and/or in an upper surface 68 of a lower body 70. The upper and lower body together form a body 72 of the artificial fishing lure 50. The first portion 60 of the cavity 52 extends through the body 72 and the second portion 62 is closed at each side of the body 72. A weight 74 is embedded in a forward portion of the lower body 70. The U-shaped member 54 has two parallel fins 76 which extend along either side of the body 72.

Figure 12:
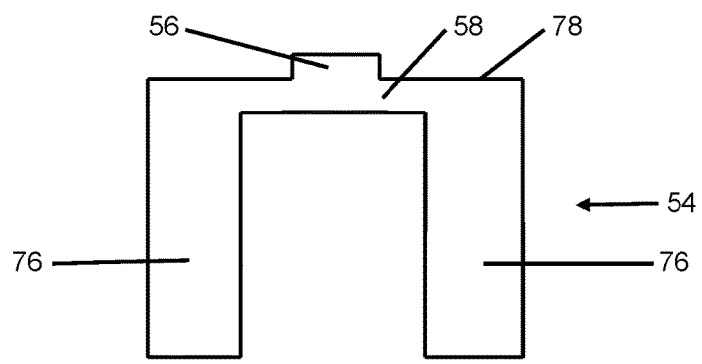
FIG. 12 is a top view of the U-shaped member having a tab that extends forward from a central portion of a base.
Figure 13:
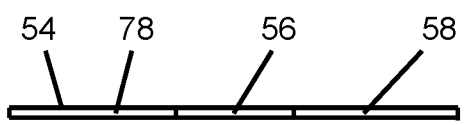
FIG. 13 is a view of a leading edge of a U-shaped member of FIG. 12.

The cavity 52 of the second embodiment must accommodate the tab 56 of the U-shaped member 54 and therefore has a different shape than the cavity 8 of the first embodiment, which must accommodate the tab 44 of the U-shaped member 24. The second portion 62 is shaped to receive at least a portion of the tab 56 and to limit a range of movement of the tab 56. Preferably, the first portion of the cavity has a first upper surface that extends forward and slopes upward above a substantially horizontal first lower surface. Preferably, the second portion 62 has a second upper surface that slopes upward and forward from the first portion and a second lower surface that is substantially horizontal. The weight 74 of the second embodiment has a different shape from the weight 36 of the first embodiment because of the different shapes of the cavities 52, 8 respectively. The same reference numerals are used in FIGS. 12 and 13 as those used in FIGS. 10 and 11 for the U-shaped member 54. In FIG. 12, there is shown a top view of the U-shaped member 54 and in FIG. 13, there is shown an edge view of the U-shaped member 54 along a leading edge 78. In FIG. 13, it can be seen that the U-shaped member 54 is planar.

The remaining reference numerals in FIGS. 10 and 11 are the same as the reference numerals that are shown in FIGS. 1 to 3 for the same components.

Numerous variations to the lure as shown and described, within the scope of the claims, will be readily apparent to those skilled in the art.

I claim:

1. An artificial fishing lure for use in water with a fishing line while ice fishing or still fishing, the lure comprising:
   a) a stream-lined elongated body generally simulating a fish, the body having a head and a tail, the body having a cavity located therein approximately one quarter of the distance from a forward end of the body to a rearward end of the body;
   b) the cavity having a first portion and a second portion, the first portion extending through the body and being open at each side, the second portion being closed at each side, the cavity shaped to receive a U-shaped member;
   c) the U-shaped member having a base and two substantially parallel fins extending from opposite ends of said base, with a tab extending from a central portion of the base, a central portion of the base and the tab being located within the cavity and the two parallel fins extending rearward along either side of the body toward the tail, the tab being located at least partially within the second portion;
   d) the base, the tab and the cavity being shaped to limit downward and upward movement of the parallel fins relative to the body within a predetermined range;
   e) an attachment on the body to attach a fishing line to and at least one fish hook extending outward from the body;
   f) the two parallel fins each having a leading edge and a trailing edge, the two parallel fins importing forward motion to the lure by moving upward relative to the leading edge when the lure is lowered in the water and rotating downward when the lure is raised in the water.

2. The artificial fishing lure as claimed in claim 1 wherein the first portion of the cavity has a ceiling that is angled upward toward the forward end and a floor that is substantially horizontal when the lure is substantially horizontal, the second portion being located rearward of the first portion, having a supporting surface that is angled downward toward the rearward end, the tab extending rearward from the central portion of the base.

3. The artificial fishing lure as claimed in claim 2 wherein the downward movement of the parallel fins is limited by one or more of the central portion of the base abutting the ceiling and the tab abutting the supporting surface and the upward movement of the parallel fins is limited by one or more of the central portion of the base abutting the floor or the tab abutting an upper surface of the second portion.

4. The artificial fishing lure as claimed in claim 1 wherein the first portion of the cavity has a first upper surface that extends forward and slopes upward above a substantially horizontal first lower surface and the second portion has a second upper surface that slopes upward and forward from the first portion and a second lower surface that is substantially horizontal when the lure is substantially horizontal, the tab extending forward from the central portion of the base.

5. The artificial lure as claimed in claim 4 wherein the second upper surface and the second lower surface are extensions of the first upper surface and the first lower surface.

6. The artificial fishing lure as claimed in claim 2 wherein the body is comprised of an upper body and a lower body, the cavity being located in the upper body and/or the lower body, the upper body being affixed to the lower body when the lure is assembled.

7. The artificial fishing lure as claimed in claim 3 wherein the U-shaped member has a movable pivot axis when the parallel fins move relative to the body.

8. The artificial fishing lure as claimed in claim 1 wherein there are guides extending outward from the body at or near the tail.

9. The artificial fishing lure as claimed in claim 1 wherein the U-shaped member is freely mounted in the cavity.

10. The artificial fishing lure as claimed in claim 3 wherein the at least one hook is located at the forward end of the body.

11. The artificial fishing lure as claimed in claim 3 wherein there is at least one fish hook Mounted at the rearward end of the body.

12. The artificial fishing lure as claimed in claim 1 wherein the fishing line is attached at the attachment.

13. The artificial fishing lure as claimed in claim 1, wherein the body is made from a plastic material and the lure has a density greater than the density of water.

14. The artificial fishing lure as claimed in claim 1 wherein the body is made from a plastic material and the forward end of the elongated body contains a weight, the lure having a density greater than the density of water.

15. The artificial fishing lure as claimed in claim 1 wherein the U-shaped member is made from stainless steel.

16. ORIGINAL A method of constructing an artificial fishing lure, the fishing lure comprising an upper body and a lower body, a U-shaped member having a base and two substantially parallel fins extending from opposite ends of the base, with a tab extending from a central portion of the base, the U-shaped member being sized and shaped to be partially mounted in a cavity, the method comprising:
   a) sizing and shaping the upper and lower bodies to fit together to form a single body to generally simulate a fish;
   b) locating a cavity in the upper body and the lower body, the cavity having a first portion and a second portion, forming the first portion to be open at each side and to extend through the body, forming the second portion to be closed at either side, the cavity sized and shaped to receive the central portion of the base and the tab of the U-shaped member and to limit movement of the two parallel fins when the upper and lower bodies are placed together, forming a first portion of the cavity to extend through the body and forming the second portion of the cavity to be closed at each side of the body;
   c) inserting the U-shaped member into one of the partial cavities and fitting the upper body and the lower body together so that the central portion of the base and the tab is located within the cavity, and at least partially within the second portion, with the two parallel fins being located outside of the cavity and extending rearward along either side of the body, the two parallel fins being movable through a limited range relative to the cavity and relative to the body, affixing the upper and lower body to one another; and
   d) installing an attachment on the upper body for a fishing line and installing at least one fish hook on the body.

17. The artificial fishing lure as claimed in claim 4 wherein the body is comprised of an upper body and a lower body, the cavity being located in the upper body and/or the lower body, the upper body being affixed to the lower body when the lure is assembled.

18. The artificial fishing lure as claimed in claim 5 wherein the U-shaped member has a movable pivot axis when the parallel fins move relative to the body.

19. The artificial fishing lure as claimed in claim 5 wherein the at least one hook is located at the forward end of the body.

20. The artificial fishing lure as claimed in claim 5 wherein there is at least one fish hook mounted at the rearward end of the body.

21. The artificial fishing lure as claimed in claim 2 wherein the body is made from a plastic material and the lure has a density greater than the density of water.

22. The artificial fishing lure as claimed in claim 4 wherein the body is made from a plastic material and the lure has a density greater than the density of water.

* * * * *